FISH LINE REELING AND BAITING APPARATUS

Original Filed Aug. 22, 1969 3 Sheets-Sheet 1

INVENTOR
KENNETH F. TISON
BY Gregg & Hendrickson
ATTORNEYS

FISH LINE REELING AND BAITING APPARATUS

Original Filed Aug. 22, 1969 3 Sheets-Sheet 2

FISH LINE REELING AND BAITING APPARATUS

Original Filed Aug. 22, 1969 3 Sheets-Sheet 3

United States Patent

Re. 28,380
Reissued Apr. 1, 1975

28,380

FISH LINE REELING AND BAITING APPARATUS

Kenneth F. Tison, Petersburg, Alaska, assignor to Marine Construction & Design Co., Seattle, Wash.

Original No. 3,626,630, dated Dec. 14, 1971, Ser. No. 852,165, Aug. 22, 1969. Application for reissue Apr. 10, 1972, Ser. No. 242,843
Int. Cl. A01k *79/00, 83/02, 97/00*
U.S. Cl. 43—6.5 14 Claims

Matter enclosed in heavy brackets [ ] appears in the original patent but forms no part of this reissue specification; matter printed in italics indicates the additions made by reissue.

ABSTRACT OF THE DISCLOSURE

A semi-automatic line handling and baiting system for commercial fishing including a plurality of rotatable reels adapted to receive and dispense fish line with each reel including spokes on which spaced fish hooks on the line are engaged. The baiting portion includes a slotted bait container through which the line and hooks are drawn for hooking bait as line is fed into the water and a slotted trough above the container for accommodating the passage of floats and weights attached to the line.

BACKGROUND OF INVENTION

It is conventional practice in commercial fishing to "set" an elongated line having leaders or the like extending therefrom with hooks at the ends of such leaders in position from a boat with a buoy marker or the like so that the boat may return to raise the line and the fish caught upon the hooks. More specifically, one type of commercial fishing comprises the paying out of a ground line from the fishing vessel with an anchor first lowered to the sea bottom and floats along the length of the line with leaders or gangions extending as small lines from the ground line and carrying hooks at their ends preferably with sinkers or weights spaced between the floats and a terminal anchor and visible buoy at the end of the line. This then proves somewhat of a zigzag ground line beneath the water with the gangions and hooks extending therefrom and having bait upon such hooks so that the line may be left in position for some period of time to hook fish and may later be retrieved with the fish thereon.

In the handling of this type of fish line it is conventional at least in certain areas to coil the line in a tub or the like in order to readily pay out the line from a moving boat. With this type of line handling it is also conventional to carefully coil the line retrieved from the water and to place the separate hooks on gangions extending from the line in position so as not to foul during line payout. This may, for example, be accomplished by the provision of a cork rim or the like about a line tub with the hooks being individually stuck into the cork.

With regard to the baiting of such lines it is conventional for each hook to be individually hand baited as, for example, while the line is coiled in a tub. It will be readily appreciated that this is a rather dangerous and time consuming operation. Furthermore, it is noted that the utilization of tubs or the like for the coiling of fish line requires a substantial area upon a boat deck and the manual handling of line and the manual baiting of hooks requires a substantial amount of personal effort normally requiring a number of men to accomplish the operations.

This type of commercial fishing has been carried on for centuries in much the same manner as described above. Despite the manifold disadvantages of this manner of line handling and hook baiting there have been little or no advances in the field. It is however, recognized that at least a nominal advance has been made by the provision of at least one semi-automatic baiting system in which a funnel of some type is provided through which the ground line is passed so that hooks upon ground line gangions may pierce pieces of bait therein to remove the necessity of manually applying a piece of bait to each hook. Manifold disadvantages attached to this system and in particular is the necessity of manually attaching floats and weights to the ground line and for the provision of a free end of the ground line in the initial pass through the funnel arrangement for baiting.

The present invention provides a material improvement and simplification of the handling of commercial fishing line of the type described above and in the baiting of such a line.

SUMMARY OF INVENTION

The present invention as described below provides at least one flanged reel that is rotatably mounted and power driven for the winding of a ground line thereabout and having substantially radially extending spokes about one side of the reel for attachment of fish hooks so as to rapidly and readily coil or wind fish line about the reel while mainting the mulitplicity of separate hooks in position for ready release from the reel when the line is paid out over the stern of a boat. Individual gangions extending from spaced positions along a ground line and carrying a hook at the end of each are manually extended to the next available rotating spoke and the hook at the end thereof placed about the spoke as the ground line is wound about the reel so as to physically maintain the ground line and attached gangions in such an orderly storage position that they may be readily unwound from the reel without fouling during payout or unwinding of the line as same is fed into the water.

In addition to the foregoing, the present invention provides a fully automated baiting system and apparatus cooperating with the above noted fish line reel and particularly suited to the handling of a fishing ground line carrying both weights and floats while at the same time providing for automatic baiting of each hook thereon. This is herein provided in the form of a bait container having slotted ends and above which there is provided a trough or guide having a longitudinal slot extending between the end slots of the bait container. An included and converging ramp extends from the bait container to the reel or reels of the present invention. Consequently, as line is paid out from a reel it passes through the bait container with the gangions drawn therewith as directed by the above noted ramp so that the hooks at the end of the gangions forceably engage and hook bait. The spaced floats and weights attached to the ground line pass along or through the trough or guide member above the bait container so that the ground line then extends through the trough slot with the gangions depending therefrom to drag the hooked ends through the bait container.

Preferably the present invention is provided as a multiplicity of flanged and spoked reels mounted on a common shaft and rotated by drive means to wind a ground line thereabout as the hooks of individual gangions are engaged with successively rotating spokes to neatly store an extended fishing line about the reel. As each reel is filled with line, such line is then passed over a flange separating two reels on the common shaft and wound about the next reel. While the foregoing applies to hauling in of a line and storage of same it is to be appreciated that the manner in which the line is stored makes it extremely simple for the line to be paid out from a boat, inasmuch as the line is wound turn upon turn about successive reels and the individual gangions of the line are separately connected to individual spokes by the hooks at the end thereof without slack in the gangions.

There is also provided by the present invention ground line weights which are flat upon one side so as to be readily incorporated into the winding of a ground line about a reel hub, and in the winding of such a ground line about a reel the floats attached thereto are manually positioned about one side of the reel against a reel end flange. Thus it is not necessary to separately attach weights and floats to a line being paid out, for they may be maintained thereon during storage about the reels.

With regard to the baiting apparatus of the present invention same is provided herein as a bait container that may take the form of a tank or the like having vertically slotted front and rear end walls. Above the tank of the baiter there is provided guide means such as a longitudinally slotted trough extending substantially between the end wall slots of the container and additionally there is provided an inclined ramp converging toward an end wall slot of the container. The overall automatic baiter of the invention is preferably mounted for lateral motion across the stern of the boat so as to successively position the baiter in line with successive reels of the invention as the ground line is unwound therefrom. The ground line generally passes through the bait tank but spaced floats and weights upon the ground line ride through the longitudinally slotted trough or the like above the bait tank or container so that spaced portions of the ground line pass above the container with the gangions thereof depending from the trough through the slots so that the hooks at the end of such gangions are drawn through bait in the trough. As these hooks pass through the outer end wall slot the bait engaged by each hook is impaled upon the hook so that fully automated baiting is accomplished.

Further with regard to the automatic baiter of the present invention it is noted that the end walls are preferably formed with surface tapering toward the end wall slots, for reasons discussed in more details below. At any rate it will be appreciated that the standard prior art practice of hand baiting each hook of an extended fishing line is precluded hereby. Thus the present invention removes the problems of manual handling of a fish line as it is drawn aboard ship and the manual paying out of such a line for fishing operations together with the manual baiting of the individual hooks of the line.

DESCRIPTION OF FIGURES

The present invention is illustrated as to a single preferred embodiment thereof in the accompanying drawings wherein.

DESCRIPTION OF PREFERRED EMBODIMENT

Figure 1:
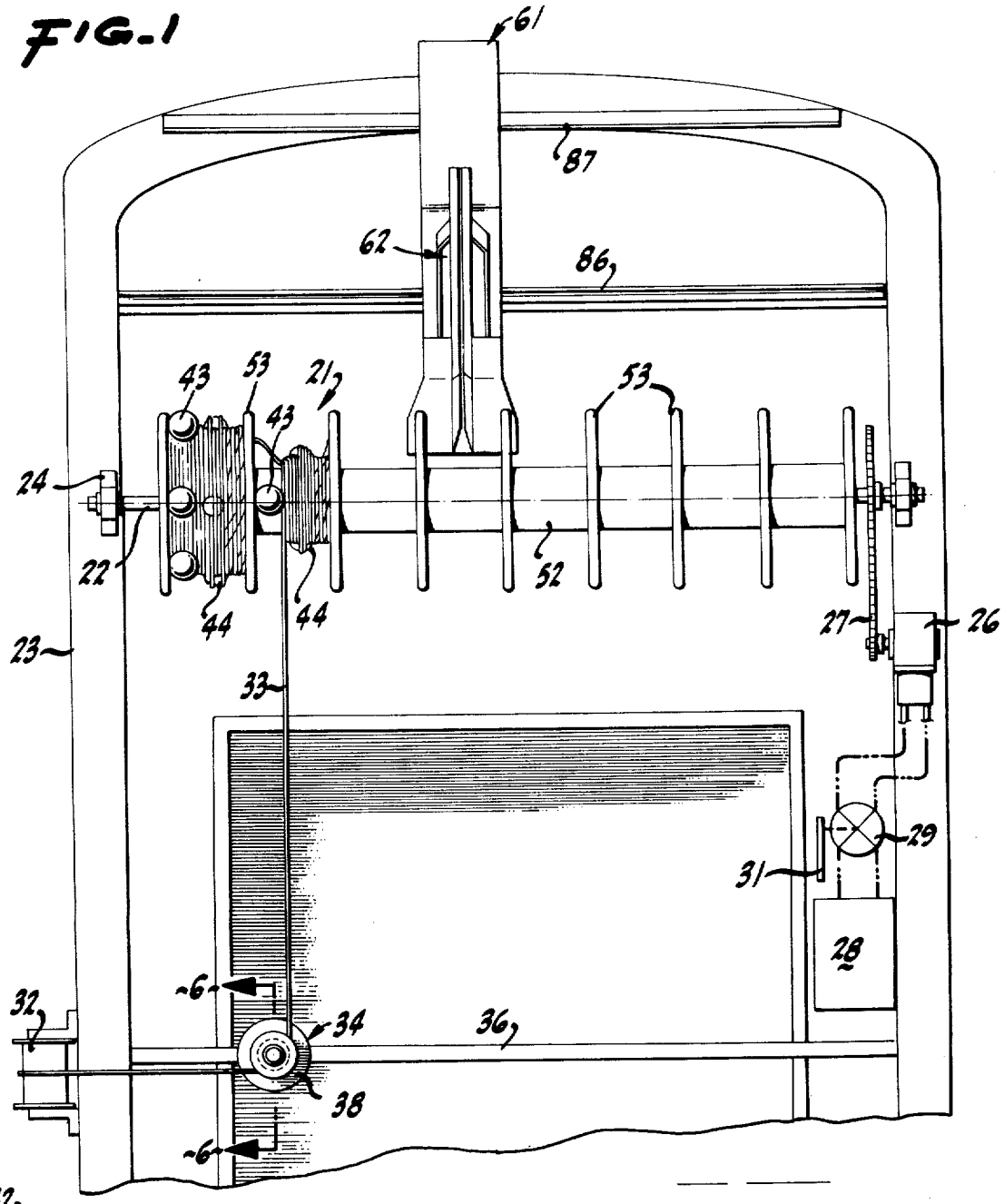
FIG. 1 is a top plan view of the stern of a fishing vessel of the like having the apparatus of this invention mounted thereon.

Considering first the general elements of the system hereof, reference is made to FIG. 1 showing a multiple reel unit 21 upon a shaft 22 extending transversely across the stern of a boat 23 and mounted in bearings 24 for rotation. Provision is made for rotating the shaft 22 carrying the reels, as for example, in the form of a hydraulic motor 26 suitably connected to the shaft as by means of a drive belt or chain 27. A hydraulic unit 28 is shown to be provided aboard the boat and connected to the hydraulic motor 26 for operating same. This connection includes a valve 29 which may be controlled, as by a control lever or the like 31, to vary the power output of the motor and to reverse the direction of rotation thereof. Thus the reel unit 21 is connected for rotation in either direction and with a controllable amount of power.

Figure 6:
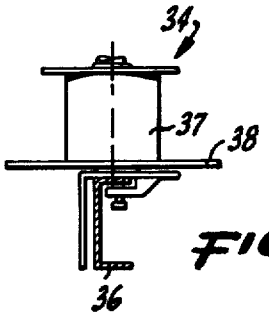
FIG. 6 is a vertical sectional view taken in the plane 6—6 of FIG. 1 and illustrating an adjustably positioned fair lead.

In addition to the above noted portions of the present invention there is provided means for directing a line onto portions or segments of the reel unit as the line is withdrawn from the water. These means include a roller guide or the like 32 extending from the side of the boat and leading a line 33 over the gunnel. A fair lead 34 is provided on the deck of the boat for redirecting the line 33 toward the reel unit 21. This fair lead 34 may be comprised as a cylindrical guide movably mounted upon a beam 36 extending transversely of the boat. While the design of the fair lead may vary, one example thereof is illustrated in FIG. 6 wherein it will be seen that there is provided a cylindrical guide 37 having a large bottom flange 38 and a small top flange. The fair lead may be clamped to the transverse beam 36, as illustrated, so that it may be slid along the beam to any desired position and affixed to the beam in such position.

As will be seen in FIG. 1, the line 33 is withdrawn from the water over the gunnel guide 32 to pass inboard of the boat over the deck thereof and then about the fair lead 34 to extend toward the stern of the boat to the reel unit 21. By movement of the fair lead along the beam 36, the line 33 may be directed toward any desired segment or separate reel of the reel unit 21, as described in more detail below.

Figure 2:
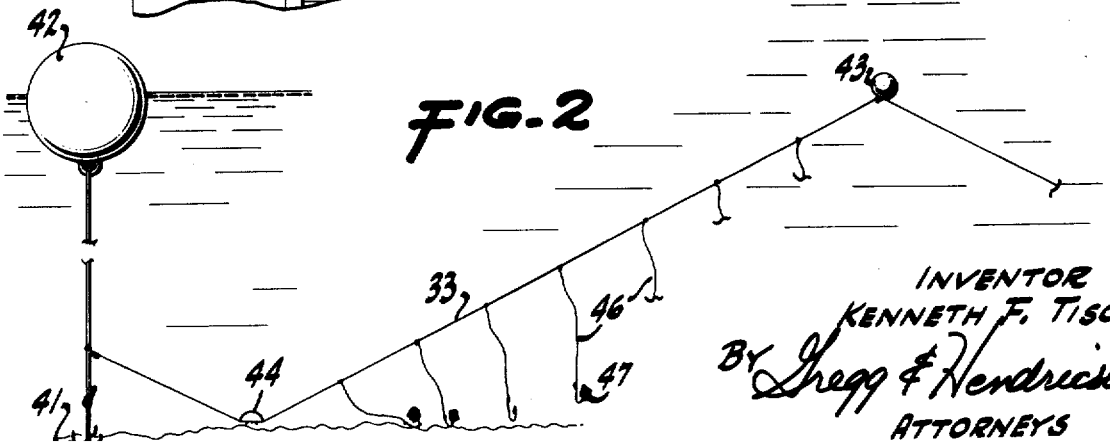
FIG. 2 is a schematic illustration of a portion of a fishing line, as may be employed with the present invention, in place below the water.

Before proceeding with a more detailed description of the present invention it is of interest to note at least one type of commercial fishing operation wherein the present invention is advantageously employed. In this respect reference is made to FIG. 2 wherein there will be seen to be shown a line commonly denominated as a ground line 33 which at the illustrated end is connected near the bottom of a buoy line having an anchor 41 at the bottom end thereof and a buoy 42 at the top end. The buoy line is of sufficient length to extend from the bottom of the water to the surface so that the buoy 42 is visible when the fishing line is in position as shown. The ground line 33 is provided with spaced floats and weights such as schematically illustrated at 43 and 44 repsectively. Thus the ground line forms somewhat of a zigzag along the ocean floor and the other end of the line from that shown is connected to an anchor. Normally the floats 43 are not sufficiently buoyant to raise the line out of the water but instead are provided at least in certain fishing operations for the purpose of preventing the line from merely laying along the bottom of the water. Along the ground line 33 there are provided leaders or gangions in the form of relatively short lengths of lighter line. It will be seen in FIG. 2 that these gangions 46 extend from the ground line 33 at spaced points therealong and are each provided with a hook 47 at the end thereof.

In practice the type of fishing gear described above is placed in position by attaching an anchor to the end of a ground line and dropping it over the stern of a fishing boat. The boat then moves slowly through the water over the desired location of the line while the line is being paid out from the stern of the vessel. Each hook upon a gangion is baited by the attachment of some type of bait thereto and in prior practice it has been necessary to manually attach floats and weights to the line as desired and also to manually bait each of the hooks. The present invention provides for automatic baiting of the hooks and also for maintaining the floats and weights on the line during storage so that no manual attachment thereof is required during paying out of the line. At the end of the ground line being paid out same is attached for example to a buoy line having an anchor thereon and the fishing vessel proceeds underway to pay out the buoy line until the anchor reaches or approaches the bottom and a buoy is then attached to the end of the line. This prevents or at least limits anchor drift while settling. In practice the length of the buoy line is made greater than the depth of the water so that the buoy will not be submerged by currents or the like nor will it exert an undue pull upon the ground line.

Figure 3:
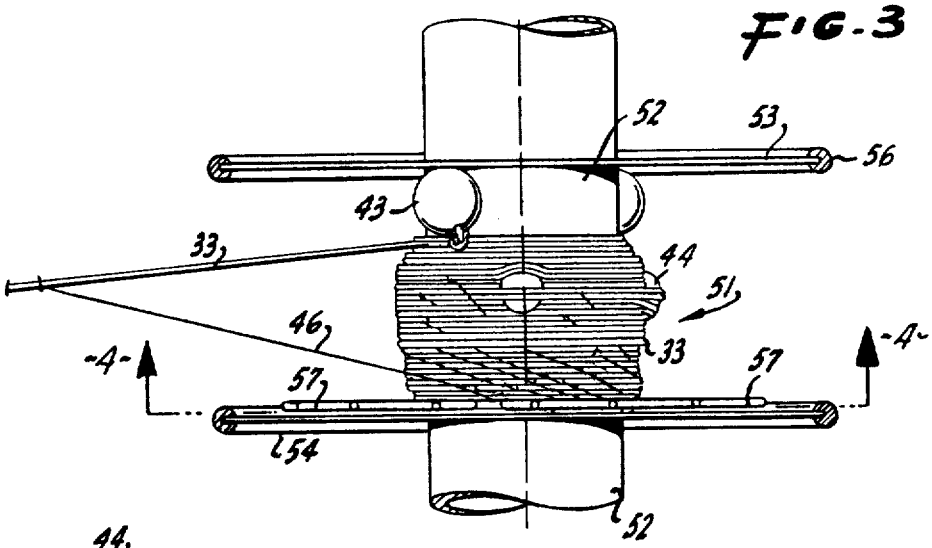
FIG. 3 is an enlarged top plan view of a reel with a portion of fishing line wound thereabout.
Figure 4:
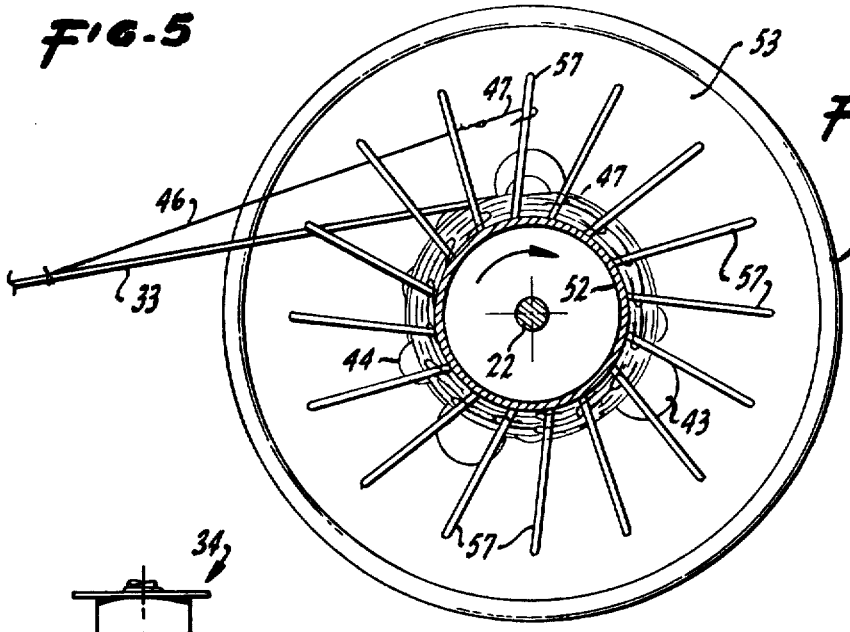
FIG. 4 is a vertical sectional view taken in the plane 4—4 of FIG. 3.

Considering now the present invention in more detail, reference is made to the reeling apparatus hereof as generally illustrated in FIG. 1 and as shown in detail in FIGS. 3 and 4. The reel unit 21 will be seen in FIG. 1 to comprise a plurality of contiguous flanged reels mounted upon a single axle or shaft. The reel storage and dispensing portion of the present invention basically comprises a rotatably mounted reel but is preferably provided as a plurality of such reels in general practice. A single reel 51 as shown in FIG. 3 as including a central hub 52 with end flanges 53 and 54 thereabout. These flanges are formed with rounded or smoothly curved outer surfaces as indicated at 56, for reasons described below. In addition, the reel includes a plurality of spokes 57 extending outwardly from the hub 52 thereof adjacent one of the end flanges 54. While these spokes are generally radially disposed of the hub it will be seen from FIG. 4 that the spokes are actually included slightly from a radial direction and this inclination is provided in a direction toward the stern of the vessel in the position at which the reel is mounted. More particularly, the spokes 57 are inclined with respect to a radial direction slightly toward the direction of rotation of the reel during winding of the ground line 33 thereupon. The reason for this slight inclination will become apparent from the following description of operation of the invention.

Figure 5:
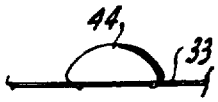
FIG. 5 is a side elevational view of a fish line weight as may be employed on the line utilized in this invention and mounted upon such a line.

Considering now the winding of fishing line about a reel, it is first noted that the ground line 33 is wound about the hub 52 and after initial looping about the hub this is accomplished by operation of the hydraulic motor 26 to rotate the reel in a clockwise direction as viewed in FIG. 4. As the ground line is wound about the hub each gangion 46 is extended toward the reel and the hook 47 at the end of the gangion is slipped about a spoke 57. Thus as the reel slowly rotates the ground line is wound about the reel and the gangion is also wound about the reel with the hook at the end of the gangion maintained upon a spoke 57. It will be appreciated that as the reel rotates the hook will ride down the spoke so as to rest against the hub or against other hooks already on the spoke, in the manner shown in FIG. 4. The inclination of the spokes is advantageous in preventing hooks from slipping off of the spoke when first engaged therewith and also to enhance the inward movement of the hook along the spoke to the hub. It is additionally noted that the floats 43 and weights 44 remain engaged to the ground line as it is wound about the hub of the reel. To this end there is preferably employed a weight 44 having a generally flat undersurface and hemispherical upper surface such as illustrated in FIG. 5. With this type of weight clipped or otherwise engaged to the line 33 it is possible to merely wind the line and weights together about the reel hub, such as indicated in FIGS. 3 and 4. No sharp edges are provided by the weights to cut or wear the line as successive windings thereof pass over such weights. Also, with this type of flat bottomed weight, it is substantially impossible for a subsequent turn of line on the reel hub to be located beneath a weight. This latter point is quite important insofar as unreeling of the line is concerned. With regard to the floats 43 a preferable manner of handling same when they are retained on the line during storage upon the reel is to move the reel winding to the left, for example, as a float approaches the reel during the winding operation and thus to locate the float against the flange at the other end of the reel from the spokes. This is also illustrated in FIG. 3.

Further with regard to the storage of line on the reel, it is noted that the gangion hooks are manualy engaged with an appropriate spoke with the gangion in tension as the reel is rotated and also the ground line is manually moved across the reel as required during the winding in order to locate the floats in the proper position. Furthermore, it is important that the ground line not be broken as it is reeled in and to this end the drive means, here illustrated as a small hydraulic motor, preferably operates with relatively low power. Thus if the line snags at the bottom of the water for example there will not occur a sharp jerk that might part the line. Also the operator may readily increase the driving power by the control means 31, for example, as required to continue to reel in the line.

As an individual reel is filled so that the line is wound about the reel hub substantially to the periphery of the reel flanges 53 and 54, the operator manually moves the incoming line over the top of a reel flange so that it is then subsequently wound about the hub of the next contiguous reel. In FIG. 1 there is generally indicated a first reel of the unit 21 as being substantially filled with fish line and attachments, with the line being in the process of winding about the next reel to the right of the filled reel. It is of course to be appreciated that with a multiple reel arrangement such as shown in FIG. 1 the line should be wound to fill reels in succession along the length thereof. As noted above, the reel flanges have the peripheries 56 thereof formed as a smoothly contoured surface so that a ground line passing thereover from one reel to the other does not bear upon any sharp or abrasive surface that might damage or part the line.

As the line is wound about successive reels of the unit the fair lead 34 is moved laterally across the boat upon the mount 36 thereof so that the line then proceeds substantially perpendicularly to each reel upon which it is wound. It will be further appreciated that during normal operation of drawing in a fishing line from the water the line will be wound under tension onto the reel and furthermore that fish caught upon the hooks of the line will be removed prior to winding the line about the reels. This operation may be accomplished as the line is passing between the fair lead and reel unit. As the last of the line is drawn aboard, the anchor may be removed from the end thereof and the reeling in of the fishing line and gear is then completed. The buoy line with buoy and anchor may be left in the water or reeled aboard for storage.

In order to pay out the ground line it is only necessary to drop the end of the line over the stern with an anchor on the line and for the boat to get underway with the reel shaft free to rotate. Control over unreeling may be provided by a brake on the reel shaft or by operating the drive means in reverse. During unreeling the shaft 22 rotates in a counterclockwise direction as viewed in FIG. 4. As the line is paid out the hooks slip off the spokes in succession so that no handling of same are required.

Figure 10:
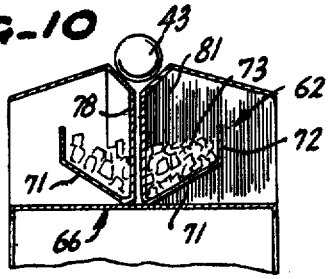
FIG. 10 is a transverse sectional view of the baiter taken in the plane 10—10 of FIG. 8.

As a further portion of the present invention there is provided an automatic baiter for the application of bait to hooks of fishing gear such as that described above. This baiter is particularly adapted for utilization with the reeling and unreeling apparatus described above. A preferred embodiment of the baiter is illustrated in FIGS. 7 to 10 and referring thereto there will be seen to be provided what may be termed an automatic baiter 61 including a bait container 62, a ramp 63 leading thereto and an elongated slotted line guide means 64 extending over the bait container. In the illustrated embodiment of the present invention the physical structure of the baiter 61 includes a base plate 66 having a central elongated portion 66 carrying the bait container 62 with an inclined forward portion 68 forming the base of the ramp 63 and an inclined stern portion 69 adapted to extend over the stern of a fishing boat. The bait container 62 is formed with upwardly inclined bottom walls 71 as shown in FIG. 10 and side walls 72 extending upwardly therefrom so that bait 73 placed in the container will tend to compact at the bottom center thereof. A V-shaped end wall 74 closes the stern of the container and is mounted in extension upwardly from the central portion 67 of the base plate. Furthermore this end wall 74 defines a central vertical slot 76 by rearwardly extending projections of the two portions of the end wall, as illustrated. The forward end of the bait container is closed by a pair of generally vertical plate 77 extending upwardly from the central portions 67 of the base plate to form a V-shaped end wall with a point thereof directed rearwardly in the baiter. The plates defining the end walls 77 also define a central vertical slot 78 aligned with the rear container slot 76 and thereby providing an inlet and egress for the ground line and fish hooks drawn through the container.

Figure 7:
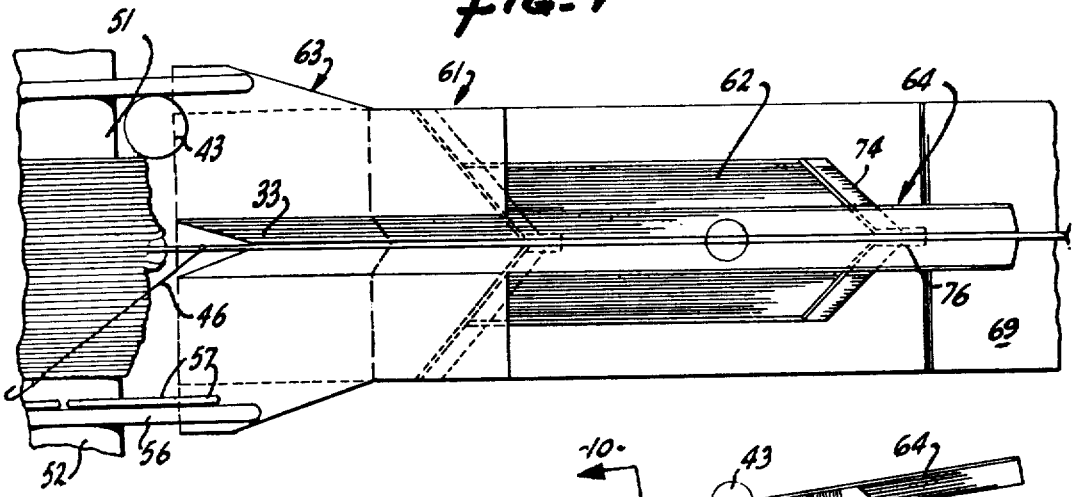
FIG. 7 is a top plan view of the baiter of the present invention.
Figure 8:
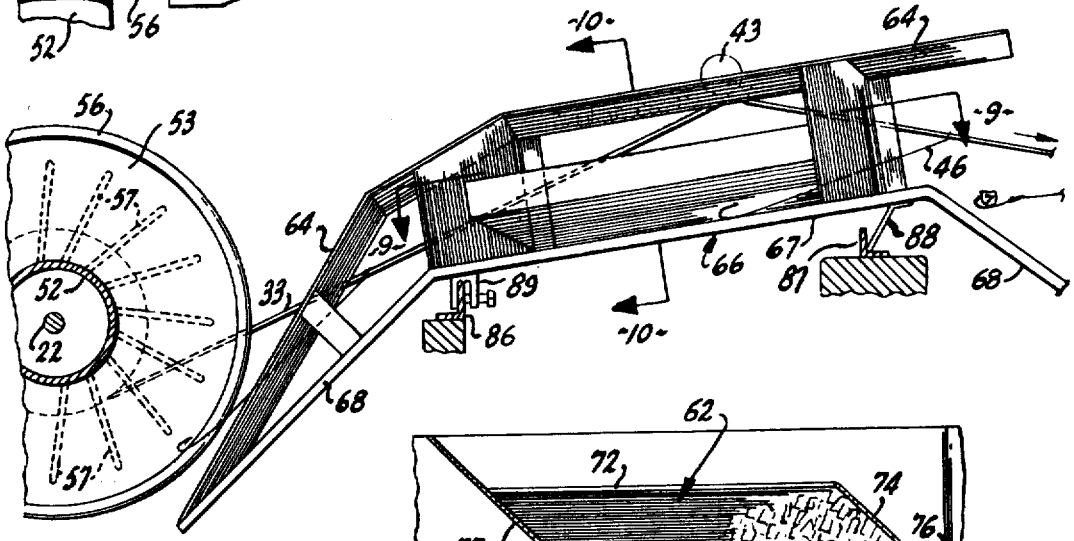
FIG. 8 is a side elevational view of the baiter of the present invention mounted upon the stern of a boat adjacent a reel of this invention.
Figure 9:
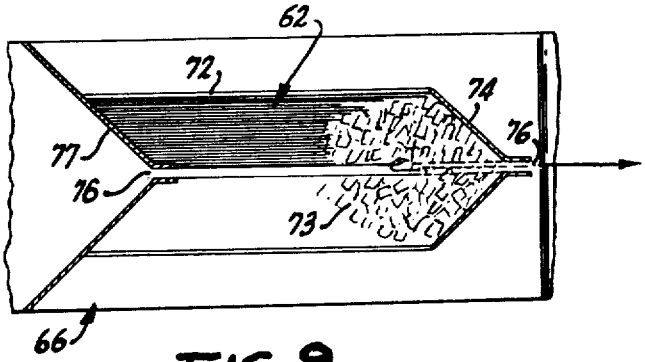
FIG. 9 is a sectional view of the baiter taken in plane 9—9 of FIG. 8.

The line guide means 64 is shown to be provided in the form of a generally V-shaped trough having a central longitudinal slot 81 therethrough and aligned with and above the vertical container slots 76 and 78. The end walls 74 and 77 of the bait container extend upwardly from the container side walls into engagement with the trough 64 for mounting the same above the container. The guide trough 64 also extends forwardly of the bait container as shown in FIGS. 7 and 8 and is there inclined downwardly into connection with the forward end of the front portion 68 of the base plate 66. As this trough approaches the base plate at the forward end thereof the trough is flaired outwardly, as indicated in FIG. 7 and it is noted that the forward portion 68 of the base plate may also be tapered outwardly toward the front end thereof.

The entire batter 61 is mounted at the stern of a fishing boat in such a manner as to be movable laterally thereacross into alignment with separate reels or reel portions of the unit 21. This may be accomplished in a manner such as illustrated in FIG. 8 by mounting a pair of spaced parallel angle plates 86 and 87 transversely across the stern of the boat with a downward projection 88 on the base plate riding upon one of such plates and a bottom clamping projection 89 riding on the other. In this way the entire baiter 61 may be manually moved transversely of the boat for alignment with the separate reels of the reel unit 21.

Considering now operation of the automatic baiter of the present invention it is first noted that same may be located to extend the forward ramp 63 thereof beneath the rear edge of a reel 51 with which it is aligned. The ground line 33 is first placed across the trough 64 to extend over the stern of the boat with the end of the line being weighted, as for example by an anchor. The line slips through the trough slot 81 to extend through the bait container 62. The reel 51 is rotated, as by the drive means 26, in a counterclockwise direction in FIGS. 7 and 8, and with the boat underway the line will be drawn through the baiter. The gangions 46 are drawn by the ground line through the baiter so as to draw the hooks 47 through the bait container 62. As the reel 51 rotates successive hooks will slide outwardly on their reels spoke 57 to leave the reel and thence fall upon the ramp 63 and as the ground line passes through the baiter the gangion itself will be drawn onto the ramp with the hook thereof riding along the base plate 66. The hook will then be drawn through the front bait container slot 78 and through the bait 73 disposed in the container. The hook thus impales one or more pieces of bait and in passing through the rear slot 76 of the container has the bait firmly forced onto the hook. After the hook leaves the container it slides down the rear portion 69 of the base plate to fall into the water.

Further to operation of the present invention it is noted that floats 43 and weights 44 are retained at all times upon the ground line and thus these floats and weights ride in the trough 64 with the ground line actually being located below the trough except at the point where it engages a float or weight. This is clearly illustrated in FIG. 8 of the drawing and it will be appreciated that only at spaced points is the ground line connected to a weight or float that is disposed in the trough, so that the ground line normally extends across the base plate through the bait container. As each float and weight leaves the reel it will ride up and along the trough carrying the ground line therewith. The converging front wall 77 of the bait container 62 directs the hook into the container as the gangion thereof is drawn through the slot 78. The converging rear wall 74 of the container and the inclined bottom side 71 of the container provide for location of the bait in proper position for hooking by the hooks as they pass through the container.

It will be seen from the foregoing that the present invention provides for the storage of commercial fishing line and gear upon reels that are rotated to draw the line from the water and also for paying out the line. This then materially simplifies the handling of fishing gear. The invention furthermore provides for the automatic baiting of hooks on commercial fishing line to obviate prior art requirement of manual baiting and also manual attachment of floats and weights to the line.

While the present invention has been illustrated with respect to a single preferred embodiment thereof it is not intended to limit the invention to the details of description or illustration. Reference is made to the appended claims for a definition of the invention.

I claim:

1. Fish line handling apparatus for fish line having spaced gangions with hooks thereon, comprising line storage reel means having provisions for orderly storage of the hooks as the line is reeled in and for releasing the hooks successively to go with the line freely as the line is being payed out from the reel means, and baiting means including a bait container having vertically slotted front and back walls and an open top, guide means extending over the top of said container and having a longitudinal slot therethrough aligned above the container wall slots, and ramp means extending from said container to said reel, whereby line unreeled from said reel means extends through the container with floats and/or weights on the line sliding along said guide means with gangions depending from the line to drag the hooks through said container and impale bait disposed therein.

2. Fish line handling apparatus as defined in claim 1, wherein the reel means comprises a plurality of line storage reel sections mounted in successively adjacent positions along a common rotational axis with each adapted to store successive length portions of the fish line as the line is reeled in and to pay out such portions in successive reverse order as the line is payed out, said baiting means being movably mounted on guide means extending generally parallel to said rotational axis to permit shifting the baiting means into successive positions of alignment with the respective sections of the reel means paying out the line.

3. The apparatus of claim 1 further defined by said container having bottom walls laterally inclined to a central longitudinal trough and V-shaped front and back walls with the convergence of each directed away from the reel and defiining said front and back wall slots for guiding hooks into and out of the container.

4. The apparatus of claim 1 further defined by said guide means comprising an elongated V-shaped trough having a central slot extending the length thereof, said trough being mounted above said container and extending downwardly at both front and back thereof, and said trough flairing laterally outward at the front of said container in extension toward said reel.

5. Fish line reeling and baiting apparatus comprising
- a plurality of contiguous reels having flanges and mounted on a common shaft for rotation of the reels, each of said reels having spokes extending outwardly from a hub thereof adjacent a reel flange for engaging fish hooks of line wound on the reel,
- means mounting said shaft transversely of a fishing boat adjacent the stern thereof,
- means controllably rotating said shaft to wind and unwind fish line,
- guide means for fish line adapted for mounting at the side of a fishing boat for guiding line withdrawn from water,
- a fair lead mounted for positioning laterally of a fishing boat ahead of said shaft for directing fish line from said guide to successive reels of said plurality of reels for winding of fish line onto the reels for storage, and
- baiting means adapted for mounting on the stern of a fishing boat behind said reels and including a slotted bait container through which fish hooks may be dragged during unwinding and paying out of fish line from said reels.

6. Fish line reeling apparatus for a fishing line including a ground line with spaced gangions extending therefrom and at least one hook at the end of each gangion, comprising at least one reel having a hub portion mounted for rotation on a substantially horizontal axis, a flange encircling the hub portion in a transverse plane adjacent one end thereof, and a plurality of angularly spaced rod-like spokes projecting outwardly substantially from the hub portion in a transverse plane adjacent the opposite end of the hub portion so as to form an uninterrupted line storage space between the flange and spokes, the spokes retaining the hooks with the ground line and gangions enwrapping the hub and projecting free to their very ends so as to permit the hooks to slide off them freely in successive order as the line is being drawn from the reel, and means for rotating the reel in one direction to wind up the line and for controlling rotation thereof reversely to pay out line.

7. The apparatus of claim 6 further defined by an automatic baiter including
- a bait container comprising a V-shaped bottom with centrally slotted front and back walls for the passage of hooks therethrough to impale bait disposable in said container, and
- a longitudinally slotted trough disposed above said container with the slot therein aligned with the end wall slots in said container for directing the passage of floats and weights attached to said ground line while the ground line generally passes through the bait container with the gangion hooks.

8. The apparatus defined in claim 6, comprising a series of such reels mounted in successive aligned positions on a common support with the flange of each successive reel being positioned immediately adjacent the spokes of the preceding reel to afford storage respectively for successive increments of continuous ground line, including gangions and hooks thereon, extending over from one reel to the next in the series.

9. The apparatus defined in claim 8, further comprising fair lead means for directing line to the successive reels generally in a transverse plane through each, and automatic baiter means for passing the line with gangions and hooks from the successive reels generally in a transverse plane through each, and positioning means operatively associated with the fair lead and baiter means to permit horizontal shifting of the operating position of such fair lead means and baiter means in directions parallel to the reel axis as the line being reeled into or from the different reels.

10. The apparatus defined in claim 9 wherein the baiter means includes a line and hook deflector having an upwardly inclined trough-like ramp leading away from an adjacent reel with which the baiter means is aligned, said ramp having inwardly sloping sides which together span the length of the reel's hub, and a longitudinally slotted bottom, the lower adjacent end of the trough partially underlying the reel such that the sides catch and guide the line, gangions and hooks for directing them through the slot into the baiter from varying departure points along the hub without necessity of shifting the baiter means.

11. The apparatus defined in claim 6, wherein the spokes project at an incline from a radial direction forwardly in the direction of reel rotation for winding line upon the reel.

12. Apparatus for storing of long lines having gangions with hooks aboard a commercial fishing vessel, comprising a succession of reels aligned on common support means for conjoint rotation on a common axis, each such reel having the means and capacity to store a fractional portion of the total line length including the associated gangions and hooks, and fair lead means operable to direct the line to individual reels one after another so as to apply the fractional portions of line thereto in successive order, the fair lead means comprising a guide for shifting its operating position in a direction parallel to the reel axis, each reel having a plurality of generally radially projecting hook retainer elements adjacent one end thereof which hold the hooks with their gangions in tension.

13. The apparatus defined in claim 6 wherein the rod-like spokes are of round exterior cross section substantially throughout their projecting lengths.

*14. Fish line reeling apparatus for a fishing line including a ground line with spaced gangions extended therefrom and at least one hook at the end of each gangion, comprising a line storage reel having a central axis and adapted to be mounted for driven rotation about said central axis to wind up line and for controlled opposite rotation to pay out line, said reel having a hub portion, line retainer means extending around and outwardly from the hub portion generally in a plane transverse to said axis adjacent one end of the hub portion, and a plurality of angularly spaced rod-like spokes projecting outwardly in relation to the hub portion at successive locations therearound generally in a plane transverse to said axis adjacent the opposite end of the hub portion so as to form an uninterrupted line storage space around the hub portion between the line retainer means and spokes, the spokes being of a size in cross section to retain the hooks slidably thereon with the ground line and gangions enwrapping the hub portion, said spokes projecting free to their outer ends so as to permit the hooks to slide freely off such ends in successive order as the line with its gangions is being drawn from the reel.*

References Cited

The following references, cited by the Examiner, are of record in the patented file of this patent or the original patent.

UNITED STATES PATENTS

| | | | |
|---|---|---|---|
| 541,789 | 6/1895 | Kunzelman | 43—43.11 |
| 1,768,981 | 7/1930 | Henrikson | 43—54.5 |
| 2,518,590 | 8/1950 | Andrist | 43—4 |
| 2,670,556 | 3/1954 | Hopkins et al. | 43—4 |
| 3,022,601 | 2/1962 | Martin | 43—54.5 |

MELVIN D. REIN, Primary Examiner

U.S. Cl. X.R.

43—27.4, 43.11